(12) United States Patent
Kojima et al.

(10) Patent No.: US 8,887,698 B2
(45) Date of Patent: Nov. 18, 2014

(54) FUEL FEED SYSTEM

(75) Inventors: Susumu Kojima, Susono (JP); Rio Shimizu, Mishima (JP); Tomojiro Sugimoto, Susono (JP); Jun Yamada, Okazaki (JP); Kazuhiro Yonesige, Nagoya (JP); Makoto Nakagawa, Obu (JP)

(73) Assignees: Toyota Jidosha Kabushiki Kaisha, Toyota (JP); Nippon Soken, Inc., Nishio-Shi (JP); Aisan Industry Co., Ltd., Obu-Shi (JP)

( * ) Notice: Subject to any disclaimer, the term of this patent is extended or adjusted under 35 U.S.C. 154(b) by 0 days.

(21) Appl. No.: 13/811,566

(22) PCT Filed: Sep. 13, 2010

(86) PCT No.: PCT/JP2010/066120
§ 371 (c)(1),
(2), (4) Date: Jan. 25, 2013

(87) PCT Pub. No.: WO2012/014333
PCT Pub. Date: Feb. 2, 2012

(65) Prior Publication Data
US 2013/0118458 A1 May 16, 2013

(30) Foreign Application Priority Data
Jul. 27, 2010 (JP) .................................. 2010-168193

(51) Int. Cl.
*F02G 5/00* (2006.01)
*F02M 21/06* (2006.01)
*F02M 31/125* (2006.01)
*F02D 19/02* (2006.01)
*F02M 31/18* (2006.01)
*F02M 21/02* (2006.01)

(52) U.S. Cl.
CPC ............ *F02M 31/183* (2013.01); *F02M 21/06* (2013.01); *F02M 31/125* (2013.01); *F02D 19/022* (2013.01); *Y02T 10/32* (2013.01); *F02M 21/0212* (2013.01); *F02D 19/027* (2013.01); *Y02T 10/126* (2013.01)
USPC ........................... 123/552; 123/551; 123/510

(58) Field of Classification Search
USPC ................. 123/552, 551, 556, 510, 511–516, 123/518–523
See application file for complete search history.

(56) References Cited

U.S. PATENT DOCUMENTS 5,711,282 A * 1/1998 Lang et al. .................... 123/549
6,689,196 B2 * 2/2004 Amano et al. .................. 96/112

(Continued)

FOREIGN PATENT DOCUMENTS

| EP | 0 330 600 A1 | 8/1989 |
| JP | A-02-169854 | 6/1990 |
| JP | A-09-004528 | 1/1997 |
| JP | A-2010-007595 | 1/2010 |
| JP | A-2010-101294 | 5/2010 |

*Primary Examiner* — Noah Kamen
*Assistant Examiner* — Long T Tran
(74) *Attorney, Agent, or Firm* — Oliff PLC

(57) ABSTRACT

A fuel feed system which causes liquid fuel to evaporate so as to feed gaseous fuel, provided with an evaporator which includes a heater which heats the liquid fuel to vaporize it and an electric heater which adjusts the temperature of the heater. The heater has a heat conduction surface which supplies heat to the liquid fuel. A difference between the temperature of the heat conduction surface of the heater and the boiling point of the fuel at the evaporator is used as the basis to change the temperature of the heater and adjust the heat flux at the heat conduction surface.

4 Claims, 9 Drawing Sheets

(56) References Cited

U.S. PATENT DOCUMENTS

| | | | |
|---|---|---|---|
| 6,966,308 B2 * | 11/2005 | Bushnell et al. | 123/546 |
| 7,370,610 B2 * | 5/2008 | Ashford et al. | 123/3 |
| 2002/0148354 A1 * | 10/2002 | Amano et al. | 96/112 |
| 2007/0193852 A1 * | 8/2007 | Ashford et al. | 196/132 |
| 2012/0060935 A1 * | 3/2012 | Carter et al. | 137/14 |

* cited by examiner

FUEL FEED SYSTEM

TECHNICAL FIELD

The present invention relates to a fuel feed system.

BACKGROUND ART

In the systems for burning liquid fuel in combustion chambers, there are known systems which feed liquid fuel to the combustion chambers and systems which vaporize liquid fuel in advance and feed gaseous fuel to the combustion chambers. As systems which feed fuel to the combustion chambers of internal combustion engines, there are known systems which inject liquid fuel to the engine intake passage or combustion chambers and systems which vaporize liquid fuel at an evaporator, then inject it to the engine intake passage or combustion chambers. As systems which vaporize the liquid fuel at an evaporator and feed it to combustion chambers, for example, there is known a system of using liquefied petroleum gas (LPG) or another gaseous fuel.

Japanese Patent Publication No. 9-4528 A1 discloses an internal combustion engine which evaporates and vaporizes liquid fuel in a warmup operation, then feeds the vaporized fuel to the engine intake passage. This publication discloses to evaporate the fuel at the relatively low temperature in the warmup operation after startup of the internal combustion engine. It discloses that the fuel vapor which is produced at the fuel evaporator in the warmup operation only contains highly volatile fuel constituents and remarkably reduces the amount of release of hydrocarbons which are contained in exhaust gas.

This publication discloses to control the feed of fuel to the fuel evaporator in accordance with the engine operation at the time of a warmup operation by a fuel adjusting system. Further, it discloses that the heating output of the fuel evaporator is related to the amount of feed of fuel and is advantageously controlled proportionally to the fuel feed amount. Further, it discloses to feed the fuel to the combustion chambers after the completion of the warmup operation by injecting liquid fuel from a fuel injector to the inside of the intake pipe.

CITATIONS LIST

Patent Literature

PLT 1: Japanese Patent Publication No. 9-4528 A1

SUMMARY OF INVENTION

Technical Problem

When vaporizing liquid fuel to feed it to combustion chambers, the evaporator is provided with a heating unit which heats the liquid fuel. The heating unit conducts heat to the liquid fuel. In this case, it preferably conducts heat to the liquid fuel efficiently.

The above Japanese Patent Publication No. 9-4528 A1 discloses to control the heating output of the evaporator of the internal combustion engine in proportion to the amount of fuel fed, but does not consider the efficiency of conduction of heat to the liquid fuel in the evaporator. For this reason, in some cases, the fuel is liable to be heated with a low efficiency. Further, sometimes the response in the amount of fuel which is actually fed to the amount of gaseous fuel which is demanded is poor. Alternatively, sometimes the heater generates excessive heat and sometimes the amount of power consumed for heating the liquid fuel or the amount of fuel consumed becomes greater.

The present invention has as its object the provision of a fuel feed system which is provided with an evaporator which can efficiently vaporize liquid fuel.

Solution to Problem

The fuel feed system of the present invention is a fuel feed system which causes liquid fuel to evaporate so as to feed gaseous fuel, which system is provided with an evaporator which includes a heater which heats the liquid fuel to vaporize it, a liquid fuel feed system which feeds the evaporator the liquid fuel, and a temperature adjusting system which adjusts the temperature of the heater. The heater has a heat conduction surface which supplies heat to the liquid fuel. The system detects the temperature of the heat conduction surface of the heater and uses the difference between the temperature of the heat conduction surface of the heater and the boiling point of the fuel at the evaporator as the basis to make the temperature adjusting system change the temperature of the heater and adjust the heat flux at the heat conduction surface.

In the above invention, preferably the heat conduction surface of the heater has a temperature at which the heat flux becomes the local maximum when the fuel changes from a nucleate boiling state to a transition boiling state and the temperature adjusting system adjusts the temperature of the heater so as to approach a temperature where the temperature of the heat conduction surface becomes the local maximum.

In the above invention, preferably a target range of the difference of the temperature of the heat conduction surface of the heater and the boiling point of the fuel is set in advance and the temperature adjusting system adjusts the temperature of the heater so that the difference of the temperature of the heat conduction surface and the boiling point of the fuel becomes within the predetermined target range.

In the above invention, preferably the liquid fuel feed system is provided with a fuel tank which stores the liquid fuel and the system detects the pressure of the gas and the temperature of the fuel of the fuel tank and uses the pressure of the gas and the temperature of the fuel of the fuel tank as the basis to estimate the composition of the fuel.

In the above invention, preferably the system detects the pressure of the gas at the evaporator and uses the detected pressure of the gas as the basis to estimate the boiling point of the fuel at the evaporator.

Advantageous Effects of Invention

According to the present invention, it is possible to provide a fuel feed system which is provided with an evaporator which can efficiently vaporize liquid fuel.

DESCRIPTION OF EMBODIMENTS

Referring to FIG. 1 to FIG. 10, a fuel feed system in an embodiment will be explained. In the present embodiment, the explanation will be given with reference to the example of a fuel feed system which is mounted in an internal combustion engine.

Figure 1:
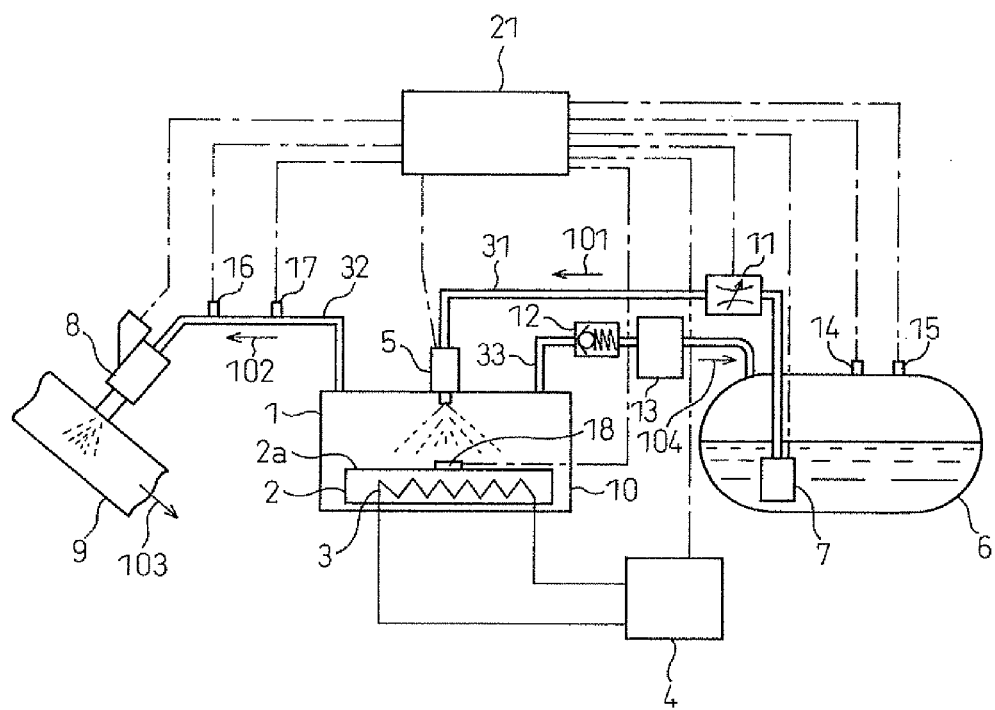
FIG. 1 is a schematic view of a fuel feed system in an embodiment.

FIG. 1 is a schematic view of the fuel feed system in the present embodiment. The fuel feed system in the present embodiment causes liquid fuel to evaporate to produce gaseous fuel. In the present embodiment, as the fuel, liquefied petroleum gas is used.

The fuel feed system in the present embodiment is provided with an evaporator 1 which heats the liquid fuel to make it evaporate. The evaporator 1 includes a container 10. The evaporator 1 includes a heater 2 which heats the liquid fuel. The heater 2 is mounted inside of the container 10. The heater 2 has a heat conduction surface 2a which contacts the liquid fuel and conducts heat to the liquid fuel. The heater 2 employed may be of any type. For example, the heat conduction surface 2a of the heater 2 may be comprised of a plurality of fins.

The evaporator 1 in the present embodiment includes an electric heater 3. By energizing the electric heater 3, the heater 2 is supplied with heat. The electric heater 3 is connected to a power source 4. The fuel feed system in the present embodiment includes a temperature adjusting system which adjusts the temperature of the heater 2. The temperature adjusting system in the present embodiment includes the electric heater 3 and power source 4. By adjusting the amount of energization of the electric heater 3, it is possible to adjust the temperature of the heater 2. For example, if the amount of heat which is supplied to the liquid fuel is constant, it is possible to increase the electric power which is supplied to the electric heater 3 to thereby make the temperature of the heater 2 rise. The temperature adjusting system is not limited to this. It need only be formed to be able to adjust the temperature of the heater.

The evaporator 1 in the present embodiment includes a temperature sensor 18 serving as a temperature detector which detects the temperature of the heat conduction surface 2a of the heater 2. The temperature sensor 18 in the present embodiment is mounted at the surface of the heat conduction surface 2a. The temperature detector which detects the temperature of the heat conduction surface 2a is not limited to this. It need only be formed to be able to directly or indirectly detect the temperature of the heat conduction surface 2a.

The fuel feed system in the present embodiment is provided with a liquid fuel feed system which feeds liquid fuel to the evaporator 1. The liquid fuel feed system in the present embodiment includes a fuel tank 6 and a fuel pump 7. The fuel tank 6 is formed to be able to store liquid fuel inside of it. In the present embodiment, the inside of the fuel tank 6 is pressurized. Inside of the fuel tank 6, liquefied petroleum gas which has been liquefied is stored.

The fuel pump 7 in the present embodiment is mounted at the inside of the fuel tank 6. The fuel pump 7 is connected to a liquid fuel feed pipe 31. The liquid fuel feed pipe 31 is connected to a liquid fuel feed valve 5 which feeds the liquid fuel into the evaporator 1. In the middle of the liquid fuel feed pipe 31, a flow regulator 11 is arranged. By adjusting the opening degree of the flow regulator 11, the amount of feed of the liquid fuel is adjusted.

The liquid fuel feed valve 5 in the present embodiment is formed so as to inject liquid fuel into the inside of the container 10. Further, the liquid fuel feed valve 5 is formed so as to inject liquid fuel toward the heat conduction surface 2a of the heater 2. The liquid fuel feed system is not limited to the above. It is possible to employ any type which feeds liquid fuel to the evaporator.

The container 10 of the evaporator 1 is connected to a return pipe 33. The return pipe 33 is connected to the fuel tank 6. In the middle of the return pipe 33, a relief valve 12 and condenser 13 are arranged. The relief valve 12 includes a check valve and is formed to open at a predetermined pressure. The relief valve 12 is formed so that when opened, gas flows from the evaporator 1 toward the fuel tank 6. The condenser 13 is formed so as to cool the gas which flows through the return pipe 33.

The fuel feed system in the present embodiment injects gaseous fuel to the inside of the intake pipe 9 of the internal combustion engine. The evaporator 1 is connected through the gaseous fuel feed pipe 32 to the gaseous fuel injector 8. The gaseous fuel injector 8 is formed so as to inject the vaporized fuel to the inside of the intake pipe 9 of the internal combustion engine.

At the fuel tank 6, a temperature sensor 15 is arranged as a temperature detector which detects the temperature of the fuel inside of the fuel tank 6. In the present embodiment, the temperature of the vapor of the fuel is detected as the temperature of the fuel, but the invention is not limited to this. It is also possible to detect the temperature of the liquid fuel as the temperature of the fuel. Further, at the fuel tank 6, a pressure sensor 14 is arranged as a pressure detector which detects the pressure of the gas inside of the fuel tank 6. The pressure sensor 14 detects the pressure of the vapor of the fuel.

At the gaseous fuel feed pipe 32, a temperature sensor 17 is attached as a temperature detector which detects the temperature of the gaseous fuel which is supplied to the gaseous fuel injector 8. Further, at the gaseous fuel feed pipe 32, a pressure sensor 16 is attached as a pressure detector which detects the pressure of the gaseous fuel which is supplied to the gaseous fuel injector 8. The gaseous fuel feed pipe 32 is communicated with the evaporator 1. For this reason, the pressure sensor 16 and the temperature sensor 17 function as a pressure detector which detects the pressure of the gas inside of the evaporator 1 and a temperature detector which detects the temperature of the gas inside of the evaporator 1.

The fuel feed system in the present embodiment is provided with a control system constituted by an electronic control unit 21. The electronic control unit 21 in the present embodiment includes a digital computer. The electronic control unit 21 includes, for example, a readable storage device constituted by a ROM (read only memory), a writable storage device constituted by a RAM (random access memory), and a CPU (microprocessor). The processing, judgments, etc. included in control are performed by the CPU. The judgment values and other predetermined information when performing control can be stored in the ROM. Further, processing results and other temporary information can be stored in the RAM.

The electronic control unit 21 receives the signals from the detectors. The output signals of the pressure sensors 14 and 16 and the output signals of the temperature sensors 15, 17, and 18 are input to the electronic control unit 21. Further, the devices which are included in the fuel feed system are controlled by the electronic control unit 21. The electronic control unit 21 is connected to the liquid fuel feed valve 5, gaseous fuel injector 8, fuel pump 7, power source 4, etc. and control these devices.

When starting up the fuel feed system in the present embodiment, the power source 4 is used to energize the electric heater 3. Due to the rise in temperature of the electric heater 3, the temperature of the heater 2 also rises. In particular, the temperature of the heat conduction surface 2a of the heater 2 rises. On the other hand, by driving the fuel pump 7, as shown by the arrow 101, liquid fuel is fed to the liquid fuel feed valve 5. By adjusting the opening degree of the flow regulator 11, the amount of feed to the liquid fuel feed valve 5 is adjusted.

The liquid fuel feed valve 5 feeds the fuel to the inside of the container 10 of the evaporator 1. The liquid fuel feed valve 5 in the present embodiment injects liquid fuel toward the heater 2. At the heat conduction surface 2a of the heater 2, the liquid fuel is vaporized. The vaporized fuel passes through the gaseous fuel feed pipe 32 and, as shown by the arrow 102, is fed to the gaseous fuel injector 8. By having the gaseous fuel injector 8 inject the fuel, it is possible to feed gaseous fuel to the inside of the intake pipe 9. The fuel which is fed to the inside of the intake pipe 9, as shown by the arrow 103, is guided to the combustion chambers of the internal combustion engine.

Control for operating the gaseous fuel injector 8 can be performed in accordance with the amount of fuel demanded. For example, in an internal combustion engine, the engine speed and load etc. are used to calculate the amount of fuel demanded. The temperature sensor 17 and the pressure sensor 16 are used to detect the temperature of the fuel and the pressure of the fuel in the gaseous fuel feed pipe 32. The detected temperature of the fuel and pressure of the fuel are used as the basis to select the injection time of the gaseous fuel injector 8. The selected injection time may be used as the basis to inject fuel from the gaseous fuel injector 8.

Control for operating the liquid fuel feed valve 5 can be performed in accordance with the amount of fuel demanded. For example, control can be performed so that the amount of the liquid fuel which is injected from the liquid fuel feed valve 5 becomes equal to the amount of fuel which is injected from the gaseous fuel injector 8. By adjusting the opening degree of the flow regulator 11, the injection time of the liquid fuel feed valve 5, etc., the amount of the liquid fuel which is fed from the liquid fuel feed valve 5 can be adjusted.

Alternatively, if the engine speed or load of the internal combustion engine rapidly rises etc., sometimes a large amount of fuel is injected from the gaseous fuel injector 8 and the gaseous fuel becomes insufficient. In control of the liquid fuel feed valve 5, for example, the pressure sensor 16 which is attached to the gaseous fuel feed pipe 32 is used to detect the pressure of the gaseous fuel which is fed to the gaseous fuel injector 8. When the pressure of the gaseous fuel becomes less than a predetermined judgment value, control may be performed so as to make the amount of liquid fuel which is fed from the liquid fuel feed valve 5 increase.

In this regard, due to the delay in control etc., sometimes the liquid fuel is excessively fed to the inside of the evaporator 1. When the amount of vaporization at the evaporator 1 becomes excessive, the pressure at the inside of the container 10 excessively rises. In the present embodiment, when the pressure at the inside of the container 10 exceeds a predetermined allowable value, the relief valve 12 opens and the pressure can be released. By opening the relief valve 12, as shown by the arrow 104, it is possible to return the fuel at the inside of the evaporator 1 to the fuel tank 6. At this time, the fuel is condensed by a condenser 13 which is arranged in the middle of the return pipe 33 whereby it is returned to the fuel tank 6 in the liquid state.

Figure 2:
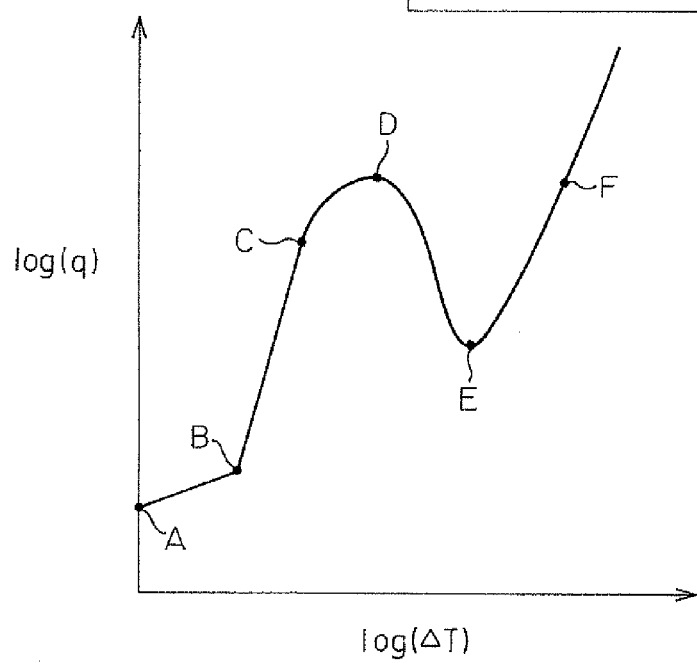
FIG. 2 is a graph which explains the relationship between a superheating degree and heat flux when heating a liquid.

FIG. 2 shows a graph which explains the heat flux when changing the temperature of the heat conduction surface of the heater. FIG. 2 shows the boiling curve which expresses the boiling phenomenon of a liquid by the superheating degree and heat flux. The abscissa shows the value of the log of the superheating degree $\Delta T$, while the ordinate shows the value of the log of the heat flux q. Here, the superheating degree $\Delta T$ is the difference between the temperature Thex of the heat conduction surface of the heater and the saturation temperature Tsat of the liquid. The superheating degree $\Delta T$ can be expressed by the following formula.

$$\Delta T = Thex - Tsat \qquad (1)$$

The larger the value of the log of the superheating degree of the abscissa, the higher the temperature of the heat conduction surface. In the graph, at the point A, heat is conducted by natural convection. The point B is the saturation start point when the liquid reaches the saturation temperature and boiling starts. The point C is the nucleate boiling limit point. In the region from the point B to the point C, the superheating degree becomes larger and the heat flux rapidly rises. Furthermore, if the superheating degree becomes larger, a point D appears where the heat flux becomes local maximum. The point D is the local maximum heat flux point. From the point B to the point D, nucleate boiling occurs. On the heat conduction surface, vapor bubbles are formed.

If increasing the superheating degree from the point D, the superheating degree becomes larger and the heat flux becomes smaller. The point E where the heat flux becomes local minimum appears. The point E is the local minimum heat flux point. If increasing the superheating degree from the point E, the heat flux becomes larger along with the rise of the superheating degree. In the region where the superheating degree is larger than the point E, film boiling occurs. For example, at the point F, film boiling occurs. In film boiling, a film of vapor is formed at the heat conduction surface as a whole. The region from the point D to the point E is the state of transition boiling. The region of transition boiling is the region of transition from nucleate boiling to film boiling. A film of vapor is partially formed on the heat conduction surface.

In this way, the heat flux changes depending on the temperature of the heat conduction surface. The fuel feed system in the present embodiment controls the temperature of the heater so as to approach a predetermined superheating degree. For example, if the type of the fuel and the pressure at the inside of the evaporator are determined, the saturation temperature Tsat at the inside of the evaporator is determined. By detecting the temperature of the heat conduction surface of the heater Thex, it is possible to calculate the superheating degree $\Delta T$. By calculating the superheating degree, it is possible to estimate the heat flux at the heat conduction surface. Alternatively, by calculating the superheating degree, it is possible to estimate the position on the boiling curve which is shown in FIG. 2. Therefore, it is possible to control the temperature of the heater so that the heat flux becomes larger.

Figure 3:
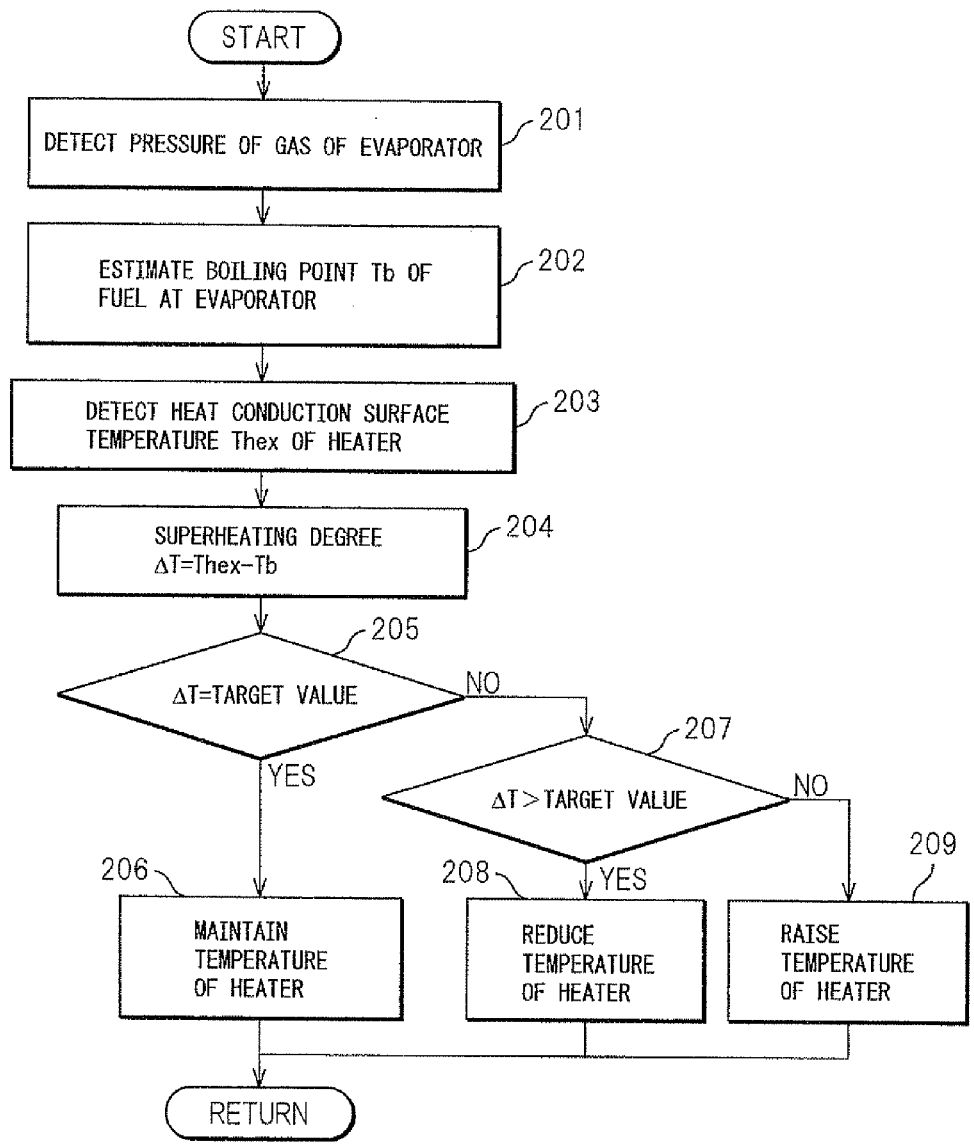
FIG. 3 is a flow chart of first control in an embodiment.

FIG. 3 shows a flow chart of first control in the present embodiment. In the first control, control is performed to determine the target value of the superheating degree where the heat flux becomes larger in advance and control the temperature of the heater so as to approach the target value of the superheating degree. Further, in the first control, the type and composition of the liquid fuel are determined in advance. The control which is shown in FIG. 3 is for example repeatedly performed every predetermined time interval.

At step 201, the pressure of the gas at the inside of the evaporator is detected. Referring to FIG. 1, the pressure of the gas of the evaporator 1 can, for example, be detected by the pressure sensor 16 which is arranged at the gaseous fuel feed pipe 32.

Next, at step 202, the boiling point Tb of the fuel which corresponds to the detected pressure of the gas of the evaporator 1 is estimated. That is, the boiling point of the fuel at the current state of the evaporator 1 is estimated.

Figure 4:
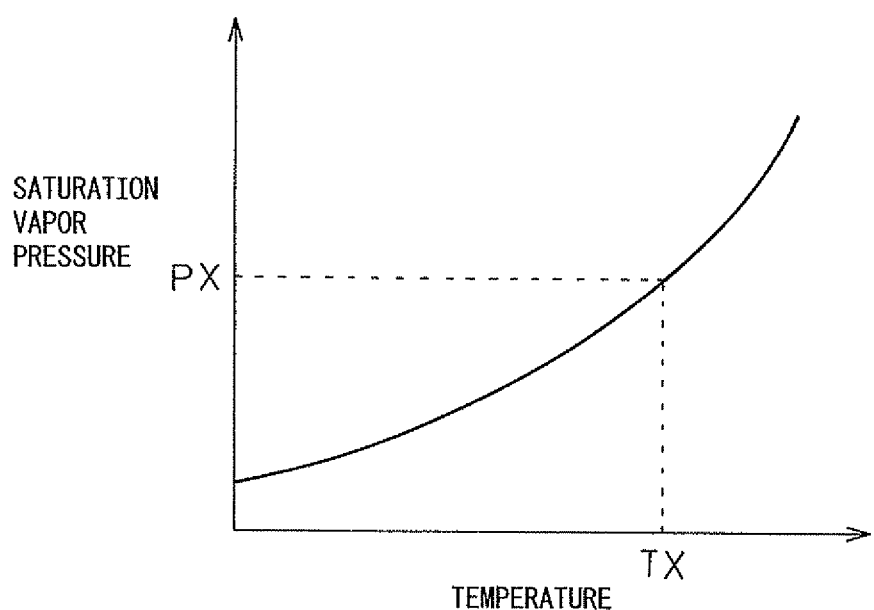
FIG. 4 is a graph of a vapor pressure curve which explains the relationship between the temperature of fuel and a saturation vapor pressure.

FIG. 4 shows the vapor pressure curve of the fuel in first control of the present embodiment. The abscissa indicates the temperature, while the ordinate indicates the saturation vapor pressure. The inside of the evaporator 1 is in a saturated state. Therefore, the relation of the vapor pressure curve can be used as the basis to estimate the boiling point corresponding to the pressure of the gas inside of the evaporator 1. For example, the boiling point corresponding to the saturation vapor pressure (pressure inside of evaporator) PX is the temperature TX. In the fuel feed system, the relationship between the temperature and the saturation vapor pressure which is shown in FIG. 4 can be stored in advance in the electronic control unit 21. The detected pressure of the gas inside of the evaporator 1 can be used as the basis to estimate the boiling point of the fuel at the evaporator 1.

Next, at step 203, the temperature Thex of the heat conduction surface 2a of the heater 2 is detected. The temperature of the heat conduction surface 2a can, for example, be detected by the temperature sensor 18. Next, at step 204, the detected temperature Thex of the heat conduction surface 2a and the estimated boiling point Tb of the fuel are used to calculate the superheating degree $\Delta T$.

Next, at step 205, it is judged if the calculated superheating degree $\Delta T$ is equal to the target value.

Figure 5:
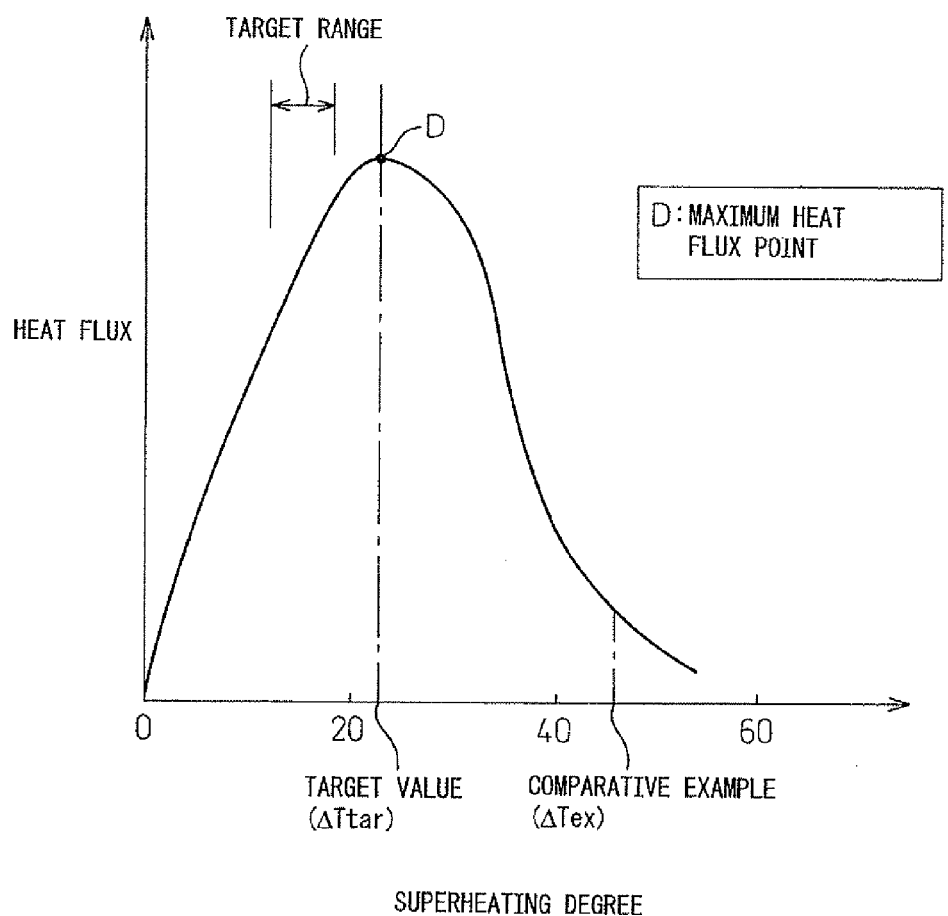
FIG. 5 is a graph which explains the relationship between a superheating degree and heat flux at a heat conduction surface of a heater in an embodiment.

FIG. 5 shows a boiling curve of fuel in the present embodiment. The abscissa shows the superheating degree $\Delta T$, while the ordinate shows the heat flux. FIG. 5 shows a region where nucleate boiling occurs and a region of transition boiling in the boiling curve. For the target value of the superheating degree in the first control of the present embodiment, the point where the heat flux becomes local maximum when shifting from the nucleate boiling state to the film boiling state is employed. That is, the superheating degree of the local maximum heat flux point of the point D is employed as the target value $\Delta T tar$.

If, at step 205, the superheating degree is equal to the target value, the routine proceeds to step 206. At step 206, the heat conduction surface 2a of the heater 2 is made to maintain the current temperature by control of the electric heater 3. For example, the amount of heat generated by the electric heater 3 is controlled to maintain the current amount of heat generated. If, step 205, the superheating degree differs from the target value, the routine proceeds to step 207.

At step 207, it is judged if the superheating degree $\Delta T$ is larger than the target value. If the superheating degree $\Delta T$ is larger than the target value, the routine proceeds to step 208.

At step 208, control is performed to lower the temperature of the heat conduction surface 2a of the heater 2. For example, control is performed to reduce the electric power which is supplied to the electric heater 3. Due to this control, it is possible to make the superheating degree approach the target value. For the amount of drop of the temperature of the heater 2 at step 208, it is possible to employ a predetermined amount of drop. Alternatively, control may be performed so that the larger the difference between the detected superheating degree and the target value, the greater the amount of drop of temperature.

When, at step 207, the superheating degree $\Delta T$ is not larger than the target value, the routine proceeds to step 209. In this case, the superheating degree $\Delta T$ is less than the target value. At step 209, control is performed to make the temperature of the heat conduction surface 2a of the heater 2 rise. In control for making the temperature of the heat conduction surface 2a rise, for example, it is possible to perform control to make the electric power which is supplied to the electric heater 3 increase. For the amount of rise of the temperature of the heater 2 at step 209, it is possible to employ a predetermined amount of rise. Alternatively, control may be performed to increase the amount of rise of the temperature the larger the difference between the superheating degree and the target value.

In the present embodiment, the temperature of the heat conduction surface of the heater is detected and the difference between the temperature of the heat conduction surface of the heater and the boiling point of the fuel at the evaporator is used as the basis to change the temperature of the heater. By performing this control, it is possible to control the heat flux at the heat conduction surface of the heater and possible to improve the efficiency of heating the liquid fuel.

Furthermore, in the present embodiment, the heat conduction surface of the heater has a temperature where the heat flux becomes local maximum when shifting from the nucleate boiling state to the transition boiling state. The temperature of the heater is adjusted so that the heat conduction surface of the heater approaches the local maximum temperature. By performing this control, the heat conduction surface of the heater can approach a state where the heat flux becomes larger. It is possible to improve the efficiency of heating the liquid fuel. As a result, it is possible to reduce the amount of heat which is supplied to the heater. For example, it is possible to reduce the amount of electric power which is supplied to the electric heater of the heater.

The target value of the superheating degree is not limited to the above. It can be set to any position. For example, the target value may also be set near the local maximum heat flux point. Alternatively, as shown in FIG. 5, it is possible to set the target range of the superheating degree in advance. When determining the target range, it is possible to set it near the point D of the local maximum heat flux point. Alternatively, the local maximum heat flux point may also be included inside the target range.

When determining the target range of the superheating degree, it is possible to perform control so that the superheating degree $\Delta T$ becomes within the target range in the control of the heater temperature. For example, in the control of FIG. 3, at step 205, it can be judged if the calculated superheating degree $\Delta T$ is in the target range. Further, at step 207, it can be judged if the calculated superheating degree $\Delta T$ is larger than the target range. Even in control for determining the target range of the superheating degree, it is possible to obtain advantageous effects which are similar to the control for determining the target value of the superheating degree.

Figure 6:
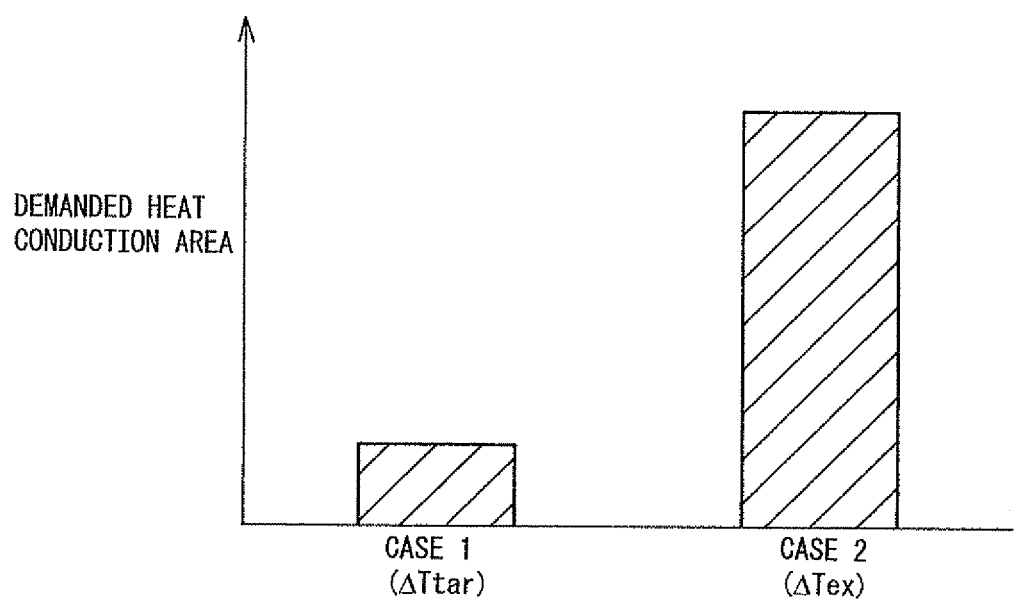
FIG. 6 is a graph of the heat conduction area which is demanded when heating at the temperature of the local maximum heat flux point in the heater and the heat conduction area which is demanded when heating at the temperature of a comparative example.

FIG. 6 shows a graph of the heat conduction area which is demanded from the heater when changing the superheating degree in the fuel feed system of the present embodiment. The ordinate shows the area of the heat conduction surface which is demanded from the heater. FIG. 6 shows a graph of the case 1 and the case 2. Referring to FIG. 5, the case 1 is the case of controlling the superheating degree to the target value ΔTtar which corresponds to the local maximum heat flux point, while the case 2 is the case of controlling the superheating degree to the comparative example ΔTex. The comparative example ΔTex is separated from the local maximum heat flux point to the high temperature side. It is learned that the heat flux becomes smaller than the target value ΔTtar in the present embodiment.

Referring to FIG. 6, it is learned that the heat conduction area of the heater which is demanded in the case 1 is smaller than the heat conduction area of the heater which is demanded in the case 2. It is learned that, like in the present embodiment, if performing controlling so as to make the superheating degree approach the target value ΔTtar, the heat conduction area of the heater can be made smaller. That is, it is possible to improve the efficiency of heat conduction at the heater. Alternatively, it is possible to make the heater small in size.

In the present embodiment, the pressure of the gas in the evaporator is detected and the detected pressure of the gas is used as the basis to estimate the boiling point of the fuel at the evaporator. Due to this configuration, it is possible to estimate the boiling point of the fuel which changes according to the operating state. Further, it is possible to estimate the superheating degree more accurately. The boiling point of the fuel which is used for the control is not limited to this. Any predetermined value may be used.

Next, the second control in the fuel feed system of the present embodiment will be explained. Sometimes the liquid fuel contains a plurality of substances. Sometimes the fuel which is refilled differs in ratios of these plurality of substances. For example, in liquefied petroleum gas, sometimes the fuel which is provided in cold areas and the fuel which is provided in hot areas differ from each other in ratios of constituents. In cold areas, the light constituents are greater, while in hot areas, heavy constituents are greater. In the second control, the composition of the fuel which is stored in the fuel tank is detected and the detected composition is used as the basis for control.

Figure 7:
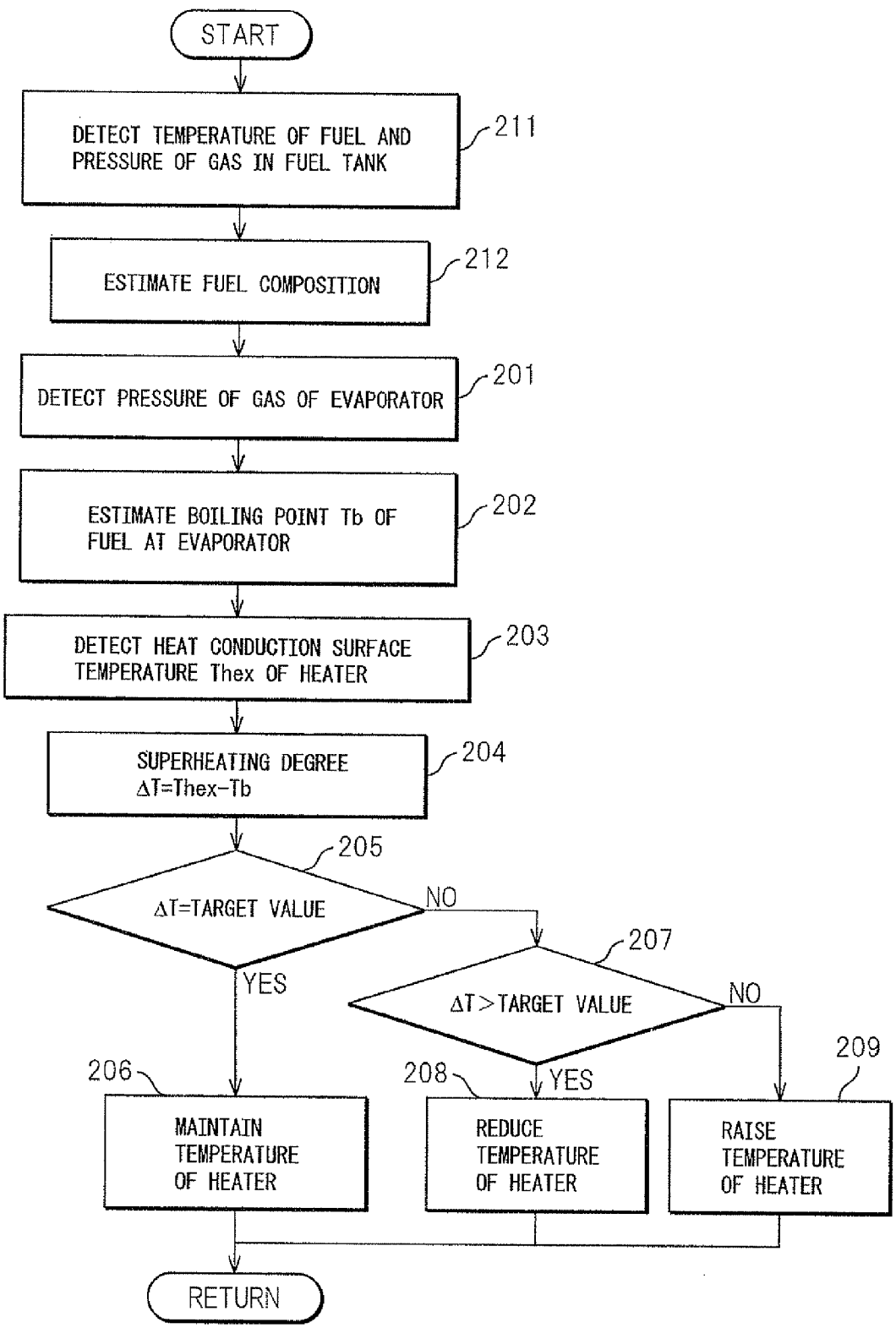
FIG. 7 is a flow chart of second control in an embodiment.

FIG. 7 shows a flow chart of the second control in the present embodiment. In the second control, the explanation will be given with reference to the example where the liquefied petroleum gas used as the fuel is comprised of propane and butane. First, the composition of the fuel which is stored in the fuel tank is estimated.

At step 211, the temperature of the fuel and the pressure of the gas in the fuel tank are detected. Referring to FIG. 1, the temperature of the fuel of the fuel tank 6 can be detected by the temperature sensor 15. Further, the pressure of the gas can be detected by the pressure sensor 14. As the temperature of the fuel of the fuel tank, the temperature of the liquid fuel may be detected.

Next, at step 212, the composition of the fuel which is stored in the fuel tank 6 is estimated. That is, the ratios of the substances which are contained in the fuel are estimated.

Figure 8:
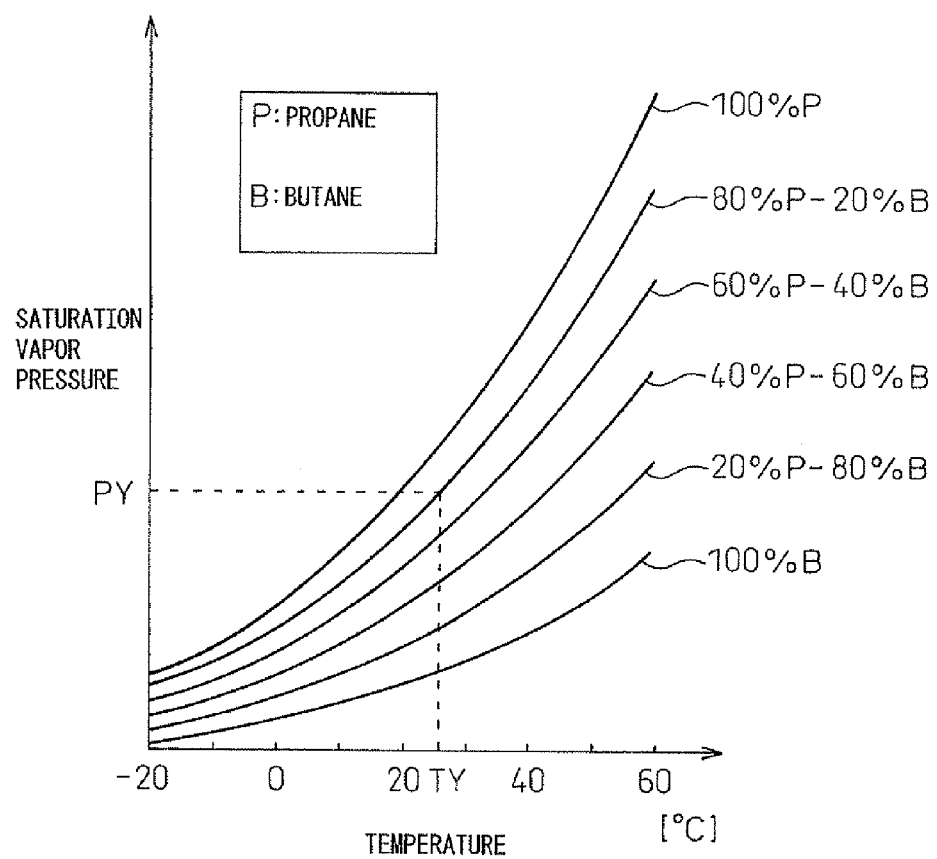
FIG. 8 is a graph which explains the relationship between a temperature of fuel which contains propane and butane and a saturation vapor pressure.

FIG. 8 is a graph which shows the relationship between the temperature of the liquefied petroleum gas and the saturation vapor pressure. FIG. 8 shows a plurality of vapor pressure curves when changing the ratios of the propane and butane. For example, the graph of 80% P-20% B shows, by molar ratio, 80% propane and 20% butane. From the graph of FIG. 8, it is learned that the greater the ratio of propane, the higher the saturation vapor pressure.

Inside of the fuel tank 6, vapor of the fuel is filled. The inside of the fuel tank 6 is in a saturated state. In the present embodiment, it is possible to detect the temperature of the fuel and the pressure of the gas of the fuel tank so as to estimate the ratios of propane and butane which are contained in the fuel. For example, the detected pressure of the gas of the fuel tank corresponds to the saturation vapor pressure PY. It is possible to use the saturation vapor pressure PY and the detected temperature TY so as to estimate the composition of the fuel.

Figure 9:
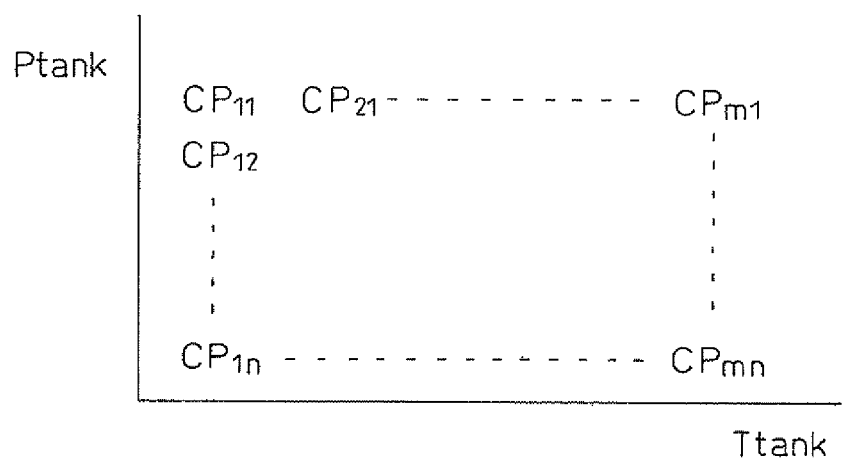
FIG. 9 is a map of concentration of propane which is contained in fuel as a function of the temperature of the fuel tank and the pressure of the fuel tank.
Figure 10:
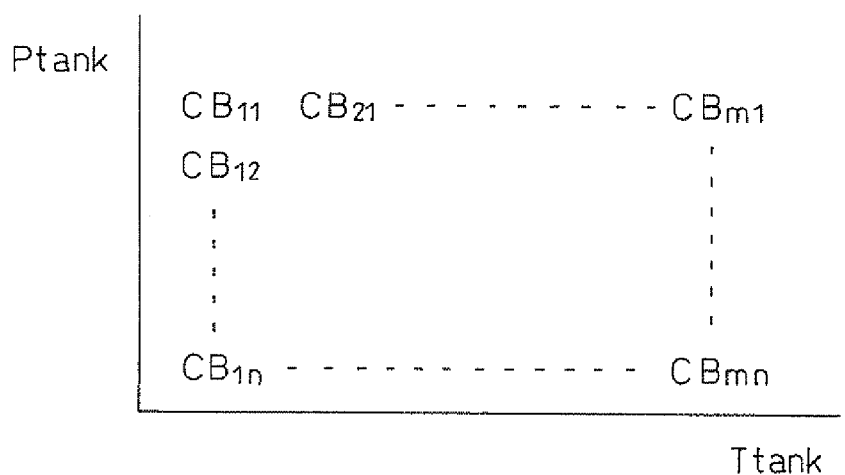
FIG. 10 is a map of concentration of butane which is contained in fuel as a function of the temperature of the fuel tank and the pressure of the fuel tank.

FIG. 9 shows a map of the ratio of the propane which is contained in the fuel as a function of the temperature of the fuel and the pressure of the gas of the fuel tank. FIG. 10 shows a map of the ratio of the butane which is contained in the fuel as a function of the temperature of the fuel and the pressure of the gas of the fuel tank. In the fuel feed system of the present embodiment, the maps which are shown in FIG. 9 and FIG. 10 are stored in the electronic control unit 21. By detecting the temperature Ttank of the fuel of the fuel tank and the pressure Ptank of the gas of the fuel tank, it is possible to estimate the propane concentration CP and the butane concentration CB which are contained the fuel. In this way, it is possible to estimate the ratios of substances which are contained in the fuel.

Referring to FIG. 7, steps after step 201 are similar to the first control in the present embodiment. At step 202, when estimating the boiling point of the fuel at the evaporator, it is possible to use the detected composition of the fuel as the basis to estimate the boiling point at evaporator. Referring to FIG. 8, it is possible to use the vapor pressure curves of the detected propane concentration and butane concentration as the basis to estimate the boiling point of the fuel at the evaporator.

In the second control of the present embodiment, it is possible to use the pressure of the gas and the temperature of the fuel of the fuel tank as the basis to estimate the composition of the fuel which is stored in the fuel tank. For this reason, even if the ratios of substances which are contained in the fuel which is refilled changes, it is possible to precisely estimate the superheating degree. Further, it is possible to perform accurate control.

In the above-mentioned first control and second control, it is possible to suitably change the order of the steps in accordance with need. For example, referring to FIG. 3, it is possible to detect the temperature of the heat conduction surface at step 203 before performing step 201.

The heater in the present embodiment includes an electric heater, but the invention is not limited to this. The heater need only be formed so as to be able to heat the liquid fuel. The heater may also include a heat exchanger.

For example, when installing the fuel feed system in an internal combustion engine and having the heater include a heat exchanger, it is possible to use the engine cooling water which cools the engine body as a high temperature side fluid and supply this to the heat exchanger. The temperature adjusting system in this case, for example, includes a flow regulator which adjusts the flow rate of the engine cooling water which flows into the heat exchanger. By adjusting the flow rate of the engine cooling water, it is possible to adjust the temperature of the heat conduction surface of the heat exchanger. For example, by increasing the flow rate of the engine cooling water which flows into the heat exchanger, it is possible to make the temperature of the heat conduction surface rise.

When mounting a heat exchanger which uses the engine cooling water as a heat source, it is possible to perform the above-mentioned control so as to suppress the drop in engine warmup characteristics when starting up the internal combustion engine. Further, when mounting the internal combustion engine in a vehicle and using the heat of the engine cooling water for heating the passenger compartment, it is possible to suppress a drop in the compartment heating performance.

In the above embodiment, the explanation was given with reference to the example of liquefied petroleum gas which contains propane and butane as the liquid fuel, but the invention is not limited to this. The liquefied petroleum gas may also contain propylene or butylene or another substance. Furthermore, the liquid fuel, it is possible to employ a fuel which is liquid when being fed to the evaporator. For example, it is possible to employ a fuel which becomes a liquid when pressurized at ordinary temperature or a fuel which is a liquid at ordinary temperature and ordinary pressure.

In the present embodiment, the explanation was given with reference to the example of a fuel feed system attached to an internal combustion engine, but the invention is not limited to this. The present invention can also be applied to a fuel feed system which vaporizes a liquid fuel and feeds it to any apparatus.

The above embodiments can be suitably combined. In the above-mentioned figures, the same or corresponding parts are assigned the same reference signs. Note that the above embodiments are illustrative and do not limit the inventions. Further, in the embodiments, changes covered by the claims are intended.

REFERENCE SIGNS LIST 1 evaporator
2 heater
2a heat conduction surface
3 electric heater
4 power source
5 liquid fuel feed valve
6 fuel tank
7 fuel pump
8 gaseous fuel injector
9 intake pipe
14 pressure sensor
15 temperature sensor
16 pressure sensor
17 temperature sensor
18 temperature sensor
21 electronic control unit
31 liquid fuel feed pipe
32 gaseous fuel feed pipe

The invention claimed is:

1. A fuel feed system which causes liquid fuel to evaporate so as to feed gaseous fuel, the fuel feed system comprising:
an evaporator which includes a heater which heats the liquid fuel to vaporize the liquid fuel;
a liquid fuel feed system which feeds the evaporator the liquid fuel; and
a gaseous fuel feed system which is connected to the evaporator; and
a temperature adjusting system which adjusts a temperature of the heater, wherein
the heater has a heat conduction surface which supplies heat to the liquid fuel,
the heat conduction surface has a temperature at which a heat flux becomes a local maximum when the fuel changes from a nucleate boiling state to a transition boiling state,
the system includes a first sensor disposed on the heat conduction surface to detect the temperature of the heat conduction surface of the heater, and a second sensor disposed on the gaseous fuel feed system to detect a boiling point of the fuel at the evaporator, to calculate a difference between the temperature of the heat conduction surface of the heater and a boiling point of the fuel at the evaporator as the basis to make the temperature adjusting system change the temperature of the heater and adjust the heat flux at the heat conduction surface, and
the temperature adjusting system adjusts the temperature of the heater so as to approach a temperature where the temperature of the heat conduction surface becomes the local maximum.

2. The fuel feed system as set forth in claim 1, wherein
a target range of the difference of the temperature of the heat conduction surface of the heater and the boiling point of the fuel is set in advance and
the temperature adjusting system adjusts the temperature of the heater so that the difference of the temperature of the heat conduction surface and the boiling point of the fuel becomes within the predetermined target range.

3. The fuel feed system as set forth in claim 1, wherein
the liquid fuel feed system is provided with a fuel tank which stores the liquid fuel and
the system detects a pressure of the gas and a temperature of the fuel of the fuel tank and
uses the pressure of the gas and the temperature of the fuel of the fuel tank as the basis to estimate composition of the fuel.

4. The fuel feed system as set forth in claim 1, wherein
the system detects a pressure of the gas at the evaporator and uses the detected pressure of the gas as the basis to estimate the boiling point of the fuel at the evaporator.

* * * * *